United States Patent Office 3,642,689
Patented Feb. 15, 1972

3,642,689
MELT STABILIZATION OF POLYESTERS
Mary J. Stewart, Riddlewood, Media, and Otto K. Carlson, Marcus Hook, Pa., assignors to FMC Corporation, Philadelphia, Pa.
No Drawing. Filed July 30, 1969, Ser. No. 846,219
Int. Cl. C08g 51/56
U.S. Cl. 260—45.7 P                     3 Claims

ABSTRACT OF THE DISCLOSURE

A thermal stabilized polyester resin comprising a saturated polyester containing a minor amount of boron phosphate.

This invention relates to highly polymeric saturated linear polyester resins that possess improved thermal stability and to a method of producing same.

The thermal stabilized saturated linear polyester resins of the present invention can be homopolymeric or copolymeric and can be used to form shaped articles such as fibers and films. The polyester resins of the present invention are known as saturated linear polyesters and can be prepared by first carrying out a condensation reaction between one or more aromatic dicarboxylic acids or esters thereof which do not contain any ethylenic unsaturation with one or more suitable lower alkylene diols to form a prepolymer. The resulting prepolymer is then polycondensed to form the desired saturated polyester resin. When an ester of a dicarboxylic acid is used as a starting material, it is first reacted with a diol in the presence of a transesterification or ester-interchange catalyst by means of an ester-interchange reaction; whereas when a dicarboxylic acid is used as a starting material, it is first subjected to a direct esterification reaction with a diol in the presence of what is generally called a first stage additive or ether inhibitor. In either instance, the resulting reaction product, which may be generally described as a polyester prepolymer, is then polycondensed in the presence of a polycondensation catalyst to form a polyester resin.

For example, in the case of the transesterification method of preparing polyethylene terephthalate, ethylene glycol is reacted with dimethyl terephthalate to form a polyester prepolymer which is comprised mainly of bis-2-hydroxyethyl terephthalate; or in the direct esterification method, ethylene glycol is reacted with terephthalic acid to form the resulting polyester prepolymer which is then polycondensed to form the desired polyester resin.

Linear polyester resins, such as polyethylene terephthalate and others, are widely used in the production of films and fibers and the like. However, it is generally known that such polyester products degrade when exposed to heat for a substantial period of time. Such degradation is particularly a problem in the extrusion and spinning processes of the finished resins to form the above-denoted products. Additionally, the fibers produced from such resins are extensively used in the textile field and, as a result of this application, are subjected to rather extreme temperatures in the processes of washing, drying, and ironing. Therefore, it is highly desirable that the polyester resin composition process as much stability at high temperature as possible.

Therefore, it is an object of the present invention to prepare highly polymeric saturated homopolymeric and copolymeric polyester resin compositions which exhibit improved thermal stability.

Another object of the present invention is to provide a method of preparing saturated linear polyester resins exhibiting such a high degree of thermal stability.

These and other objects are accomplished in accordance with the present invention with a thermal stabilized polyester composition comprising a saturated homopolymeric or copolymeric polyester resin containing a stabilizing amount of boron phosphate.

The saturated homopolymeric and copolymeric polyester resins comprising the subject thermal stabilized polyester compositions can be prepared via either the conventional ester-interchange reaction or by the direct esterification method, both of which are thoroughly disclosed throughout the prior art. Such polyester resins can be prepared from any saturated aromatic dicarboxylic acids or esters thereof and any alkylene glycol represented by the formula $HO(CH_2)_nOH$ wherein $n$ is a whole number from 2 to 10. For example, among the aromatic dicarboxylic acids that can be used are isophthalic acid, 4,4-diphenyl dicarboxylic acid, terephthalic acid, and 2,6-naphthalene dicarboxylic acid or any combination thereof, along with suitable substituted dicarboxylic acids containing ionic groups for dyeing purposes if so desired. Among the glycols that can be used, for example, are ethylene glycol, butylene glycol, hexamethylene glycol, and decamethylene glycol.

In the practice of the present invention, it is generally preferred to thoroughly mix or blend the present thermal stabilizer in the polyester resin immediately after the polycondensation step has been completed, at atmospheric pressure, while the resin is still molten in order to form a uniform blend of polyester resin and a thermal stabilizer of the present invention. However, when indicated, they can be incorporated at other suitable times during the preparation of the polyester resin.

It has been found that the present thermal stabilizer, as defined above, is effective as such in polyester resin compositions when employed in amounts ranging from about 0.01% to about 0.5%, by weight, based on the weight of the linear polyester resin. Usually, it has been found that concentrations ranging from about 0.02% to about 0.3%, by weight, are preferred in most instances. However, when indicated, concentrations less or greater than the above can be used, but their effectiveness is generally reduced proportionally.

The relative effectiveness of compounds as thermal stabilizers in polyester compositions can be most accurately expressed on the basis of percent broken bonds resulting from exposing a given resin composition containing such a stabilizer to elevated temperatures for a given period, rather than from a direct reading of the difference between the original or initial instrinsic viscosity and the final or degraded intrinsic viscosity of such a resin composition. It is known and logically expected that polyester polymers having higher original intrinsic viscosities will generally show a greater drop in intrinsic viscosity when exposed to elevated temperatures than those with lower original intrinsic viscosities, although on a percent broken bonds basis, the stability of such a resin composition having a higher original intrinsic vicosity mght be equivalent to one exhibiting a lesser drop in intrinsic viscosity.

The percent broken bonds value, as determined for polyethylene terephthalate, is defined in the bonds broken per mole of ethylene terephthalate times 100, and the values given hereinbelow in the following examples were calculated by the use of the following equation:

Percent Broken Bonds $$= \left[ \left(\frac{K}{V_f}\right)^{1/a} - \left(\frac{K}{V_i}\right)^{1/a} \right] \times 9.6 \times 10^3$$

The value of $K$ and $a$ may be found in the literature, such as Conix, A., Makromol., Chemie 26, p. 226 (1958), wherein $K=0.00021$ and $a=0.82$. $V_f$ in the above formula is the degraded or final intrinsic viscosity value and $V_i$ is the original or initial intrinisic viscosity value.

For purposes of obtaining original or initial intrinsic viscosity values for insertion in the above equation, the original intrinsic viscosity values of the polyester resin products were obtained by measuring the intrinsic viscosities of the resin compositions as produced. The degraded intrinsic viscosity values for insertion in the above equation were determined by the following procedure: The polyester resin composition was ground and passed through a 10 U.S.S. mesh screen and dried at 120° C. in vacuo for 16 hours, then cooled in a desiccator. Two to three grams of this dried resin was then placed in a test tube which was then inserted into an aluminum block preheated to 280° C. ($\pm$0.5° C.). The block was then sealed and evacuated to 0.1 mm. of mercury. After holding for about 10 to 15 seconds, the block was filled with dried, oxygen-free nitrogen gas. This vacuum-nitrogen purge was then repeated for a total of three times; the entire process took 5 to 7 minutes. Then the resin sample was left in the heated block for an additional two hours under a slow stream of nitrogen. After this two-hour period, the resin sample was removed from the block and placed in a desiccator which was first evacuated and then filled with nitrogen. The intrinsic viscosity of the resin product was then determined and such an intrinsic viscosity value is noted as the degarded intrinsic viscosity.

All of the intrinsic viscosity determinations of the polyester resin products produced in the examples below were determined in a 60% phenol-40% tetrachloroethane solution, wt./wt., at 30° C., according to conventional laboratory procedure.

EXAMPLE I

A blended mixture comprising 474 grams of terephthalic acid, 288 mls. of ethylene glycol, and 149 mls. of triethylamine was charged into a reaction vessel equipped with a nitrogen inlet, a Dean-Stark separating apparatus, heating means and stirring means. The reaction mixture was agitated and the temperature was raised to about 197° C. under anitrogen blanket at atmospheric pressure. At about 190° C., a water-triethylamine azeotropic mixture started to distill off. The azeotropic mixture was continuously separated by means of the Dean-Stark apparatus, and the triethylamine recovered was continuously returned to the reaction vessel. The reaction mixture became almost clear. Then, the temperature was allowed to rise to about 230° C. over a one-hour period to remove all the triethylamine and any excess glycol. The prepolymer product was allowed to cool under an atmosphere of nitrogen.

EXAMPLE II

Fifty grams of the prepolymer product of Example I was mixed with 0.02 gram of antimony sec-butoxide and placed in a reaction vessel. The reaction mixture was heated at about 280° C. under a residual nitrogen reduced atmosphere of from about 0.05 to about 0.1 mm. of mercury while under agitation for about two hours to bring about the polycondensation of the polyester prepolymer and formation of a filament- and film-forming polyester resin having an original intrinsic viscosity of 0.88 and a degraded intrinsic viscosity of 0.69. The percent broken bonds of this polyethylene terephthalate resin per the above-defined testing procedures and equation was calculated as 0.132%.

EXAMPLE III

Fifty grams of the prepolymer product of Example I was mixed with 0.02 gram of antimony sec-butoxide and placed in a reaction vessel. The reaction mixture was heated at about 280° C. under a residual nitrogen reduced atmosphere of from about 0.05 to about 0.1 mm. of mercury while under agitation for about two hours to bring about the polycondensation of the prepolymer and formation of a polyester resin as in Example II. After the polycondensation reaction had been completed, 0.02 gram of boron phosphate was thoroughly stirred into the polyester resin while still molten at atmospheric pressure after which the resin product was cooled. This resin composition had an original intrinsic viscosity of 0.58 and a degarded intrinsic viscosity of 0.59. Hence, the percent broken bonds of this composition per the above-identified testing procedure and equation was calculated as 0.0%.

EXAMPLE IV

A mixture comprising 600 grams of dimethyl terephthalate, 396 grams of ethylene glycol, and 0.24 gram of lithium hydride were charged into a reaction vessel equipped with a nitrogen inlet, heating means and stirring means. The reaction mixture was agitated and heated at atmospheric pressure to 198° C. under a nitrogen blanket. The reaction mixture was held at about 198° C. for about two hours during which time by-product methyl alcohol was distilled off. Then the temperature of the reaction mixture was allowed to rise to 230° C. over a period of about one hour to distill off any remaining by-product methyl alcohol and excess ethylene glycol and form a polyester prepolymer. The prepolymer product was allowed to cool under an atmosphere of nitrogen.

EXAMPLE V

Fifty grams of the prepolymer product of Example IV was mixed with 0.02 gram of antimony trioxide and placed in a reaction vessel. This reaction mixture was heated at about 280° C. under a residual nitrogen reduced atmosphere of from about 0.05 to about 0.1 mm. of mercury while under agitation for about two hours to bring about the polycondensation of the prepolymer. The polyester resin formed had an original intrinsic viscosity of 0.81 and a degraded intrinsic viscosity of 0.68. The percent broken bonds of this resin per the above-identified testing procedure and equation was calculated as 0.094.

EXAMPLE VI

Fifty grams of the prepolymer product of Example IV was mixed with 0.02 gram of antimony trioxide and placed in a reaction vessel. This reaction mixture was heated at about 280° C. under a residual nitrogen reduced atmosphere of from about 0.05 to about 0.1 mm. of mercury while under agitation for about two hours to bring about the polycondensation of the prepolymer and formation of a polyester resin as in Example V. After the polycondensation reaction had been completed, 0.02 gram of boron phosphate was thoroughly stirred into the polyester resin while still molten at atmospheric pressure after which the resin product was cooled. The resulting resin product had an original intrinsic viscosity of 0.63, and a degraded intrinsic viscosity of 0.64. The percent broken bonds of this resin composition per the above-defined testng procedure and equation was calculated as 0.0%.

The results in the above examples clearly indicate that boron phosphate when added to saturated polyester resins acts to stabilize or reduce the degradation effects of higher temperatures upon such polyester resins.

We claim:
1. A thermal stabilized polyester composition comprising a saturated linear polyester resin, prepared from a saturated aromatic dicarboxylic acid or ester thereof and an alkylene glycol having from 2 to 10 carbon atoms, containing a minor amount of boron phosphate.
2. A composition of claim 1 wherein the boron phosphate is present in an amount ranging from about 0.01 to about 0.5%, by weight, based on the weight of the polyester resin.
3. The composition of claim 1 wherein the polyester is polyethylene terephthalate.

References Cited

UNITED STATES PATENTS

| | | | |
|---|---|---|---|
| 3,305,520 | 2/1967 | Fritz et al. | 260—45.7 |
| 3,321,435 | 5/1967 | Fritz et al. | 260—45.7 |
| 3,404,121 | 10/1968 | Barkey | 260—45.7 |
| 3,420,801 | 1/1969 | Fitz | 260—75 |
| 3,446,763 | 5/1969 | Okuzumi | 260—22 |

DONALD E. CZAJA, Primary Examiner

R. A. WHITE, Assistant Examiner

PO-1050
(5/69)

UNITED STATES PATENT OFFICE
CERTIFICATE OF CORRECTION

Patent No. 3,642,689      Dated February 15, 1972

Inventor(s) Mary J. Stewart and Otto K. Carlson

It is certified that error appears in the above-identified patent and that said Letters Patent are hereby corrected as shown below:

Col. 1, line 60, "as" (first occurrence) should read --has--.
Col. 2, line 14 "4,4-" should read -- 4,4' --;

line 45 "instrinsic" should read -- intrinsic--; line 53, "vicosity" should read --viscosity-- line 56, "in" should read --as--. Col. 3, line 36 "anitrogen" should read -- a nitrogen --. Col. 4, line 34, "was" should read -- were --.

Signed and sealed this 18th day of July 1972.

(SEAL)
Attest:

EDWARD M. FLETCHER, JR.
Attesting Officer

ROBERT GOTTSCHALK
Commissioner of Patents